US005184344A

United States Patent [19]

Takeuchi et al.

[11] Patent Number: 5,184,344

[45] Date of Patent: Feb. 2, 1993

[54] RECORDING HEAD INCLUDING ELECTRODE SUPPORTING SUBSTRATE HAVING THIN-WALLED CONTACT END PORTION, AND SUBSTRATE-REINFORCING LAYER

[75] Inventors: Yukihisa Takeuchi; Toshikazu Hirota; Shigeki Okada; Natsumi Shimogawa, all of Nagoya, Japan

[73] Assignee: NGK Insulators, Ltd., Japan

[21] Appl. No.: 570,302

[22] Filed: Aug. 20, 1990

[30] Foreign Application Priority Data

Aug. 21, 1989 [JP] Japan ................................ 1-214624
Sep. 28, 1989 [JP] Japan ................................ 1-253504

[51] Int. Cl.[5] ......................... G01D 15/06; B41J 3/20; B41J 3/00

[52] U.S. Cl. .............................. 369/126; 346/76 PH; 346/155; 219/216

[58] Field of Search .............. 369/126, 173, 151, 135; 346/155, 139 C, 76 PH; 219/216

[56] References Cited

U.S. PATENT DOCUMENTS

| | | | |
|---|---|---|---|
| 3,071,685 | 1/1963 | Joyce | 346/155 |
| 3,124,804 | 3/1964 | Johnson et al. | 346/155 |
| 3,774,229 | 11/1973 | Blackwood et al. | 346/155 X |
| 3,968,500 | 7/1976 | Meisel et al. | 346/139 C |
| 4,082,619 | 4/1978 | Dehnert | 346/165 |
| 4,124,867 | 11/1978 | Fuhrer et al. | 369/126 |
| 4,297,312 | 10/1981 | Carroll et al. | 369/126 X |
| 4,300,146 | 11/1981 | Gustin et al. | 346/155 |
| 4,443,292 | 4/1984 | Lakhani et al. | 346/155 X |

(List continued on next page.)

FOREIGN PATENT DOCUMENTS

| | | |
|---|---|---|
| 0145942 | 6/1985 | European Pat. Off. . |
| 0150579 | 8/1985 | European Pat. Off. . |
| 3008498 | 1/1981 | Fed. Rep. of Germany . |
| 3435999 | 4/1985 | Fed. Rep. of Germany . |
| 3447581 | 7/1985 | Fed. Rep. of Germany . |
| 54-14110 | 11/1979 | Japan . |
| 58-12790 | 1/1983 | Japan . |
| 58-104787 | 6/1983 | Japan . |
| 59-169872 | 9/1984 | Japan . |
| 60-78772 | 5/1985 | Japan . |

(List continued on next page.)

OTHER PUBLICATIONS

May 1985, Abstract of Japan, vol. 9 No. 223 and The Whole Document.
Apr. 1985, Abstract of Japan, vol. 9, No. 213.
Jan. 1986, Abstract of Japan, vol. 10, No. 163.
"Nobel Metal Resistive Ribbon Electrode" IBM Technical Disclosure Bulletin, vol. 27, No. 12, May 1985.
"Silicon-Based Printhead Design" IBM Technical Disclosure Bulletin, vol. 22, No. 12, May 1985.
Patent Abstracts of Japan, vol. 9 No. 223 (M-411) (1946) Sep. 10, 1985.

(List continued on next page.)

*Primary Examiner*—John H. Wolff
*Assistant Examiner*—Joseph A. Rhoa
*Attorney, Agent, or Firm*—Parkhurst, Wendel & Rossi

[57] ABSTRACT

A recording head having an electrically insulating substrate (11), at least one recording electrode (12) formed on one of opposite major surfaces of the substrate, and at least one return circuit electrode (13) formed on the other major surface. The substrate is formed of a material whose wear resistance is lower than that of the electrodes, and includes a proximal portion, and a thin-walled distal end portion (16) extending from the proximal portion for contact with an electrically resistive layer of a recording medium or an ink ribbon. The distal end portion has a constant thickness smaller than that of the proximal portion, and the substrate has a recessed portion formed in at least one of the opposite major surfaces such that the recessed portion at least partially defines the thickness of the distal end portion. A reinforcing layer (17) is disposed to reinforce the thin-walled distal end portion, such that at least a portion of the reinforcing layer is positioned in said recessed portion.

17 Claims, 9 Drawing Sheets

U.S. PATENT DOCUMENTS

| | | | |
|---|---|---|---|
| 4,539,576 | 9/1985 | Chance et al. | 346/155 X |
| 4,592,041 | 5/1986 | Sanzaki et al. | 369/126 |
| 4,595,823 | 6/1986 | Sorimachi et al. | 346/76 PH |
| 4,596,009 | 6/1986 | Yoshikane et al. | 369/173 |
| 4,612,433 | 9/1986 | Nagaoka et al. | 346/76 PH |
| 4,651,168 | 3/1987 | Terajima et al. | 346/76 PH |
| 4,684,960 | 8/1987 | Nishiwaki | 346/76 PH |
| 4,763,136 | 8/1988 | Isobe | 346/76 PH |
| 4,920,363 | 4/1990 | Hack | 346/155 |
| 4,961,078 | 10/1990 | Takeuchi et al. | 346/76 PH |
| 4,965,589 | 10/1990 | Takeuchi et al. | 346/76 PH |
| 4,973,982 | 11/1990 | Nakai et al. | 346/155 X |
| 4,990,934 | 2/1991 | Takeuchi et al. | 346/76 PH |

FOREIGN PATENT DOCUMENTS

| | | |
|---|---|---|
| 60-174664 | 7/1985 | Japan . |
| 60-199669 | 10/1985 | Japan . |
| 61-35972 | 2/1986 | Japan . |
| 61-37493 | 2/1986 | Japan . |
| 61-230966 | 10/1986 | Japan . |
| 62-99162 | 5/1987 | Japan . |
| 62-161555 | 7/1987 | Japan . |
| 62-238767 | 10/1987 | Japan . |
| 62-292461 | 12/1987 | Japan . |
| 63-30279 | 2/1988 | Japan . |
| 63-87264 | 4/1988 | Japan . |
| 63-160855 | 7/1988 | Japan . |
| 2101935 | 1/1983 | United Kingdom . |

OTHER PUBLICATIONS

Patent Abstracts of Japan, vol. 9, No. 213 (M-408) (1936) Aug. 30, 1985.

Patent Abstracts of Japan, vol. 10, No. 163 (M-487) (2219) Jun. 11, 1986.

Patent Abstracts of Japan, vol. 11, No. 316 (M-631) (2763) Oct. 15, 1987.

Patent Abstracts of Japan, vol. 12, No. 109 (M-682) (2956) Apr. 8, 1988.

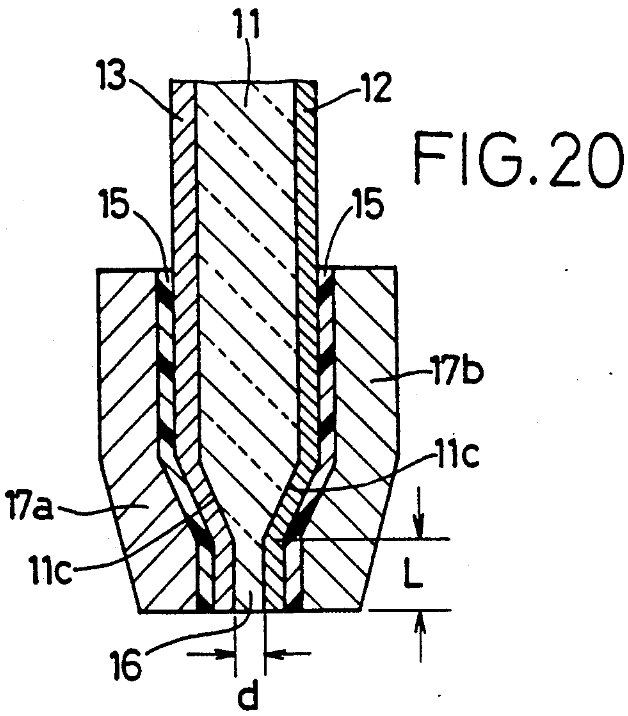
FIG. 20
FIG. 21
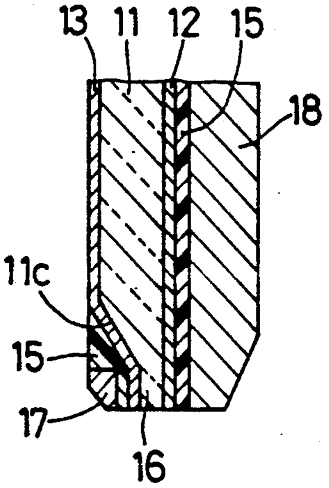
FIG. 22
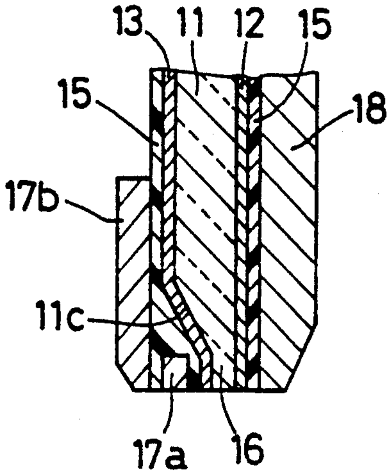

FIG. 23
PRIOR ART
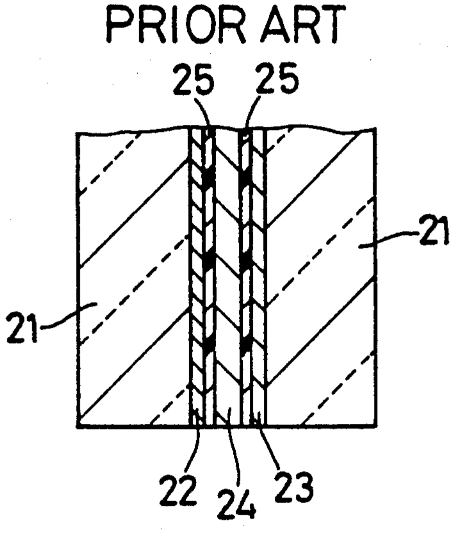
FIG. 24
PRIOR ART
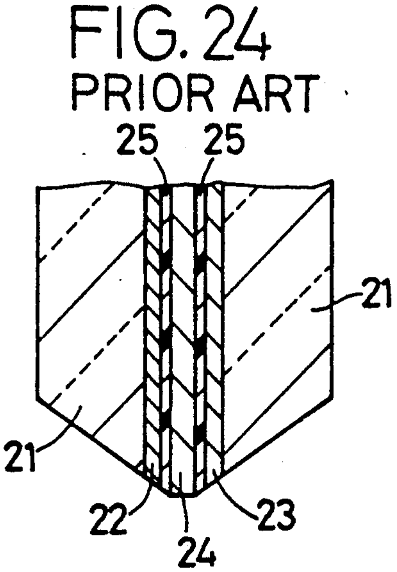
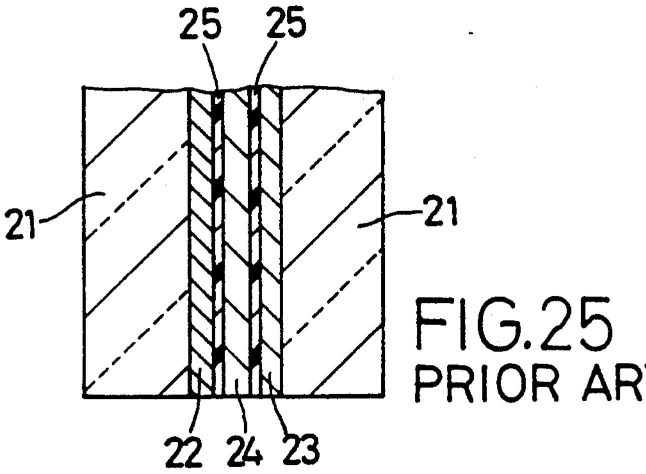
FIG. 25
PRIOR ART
FIG 26
PRIOR ART
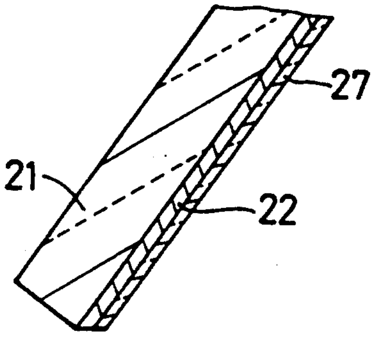
FIG. 27
PRIOR ART
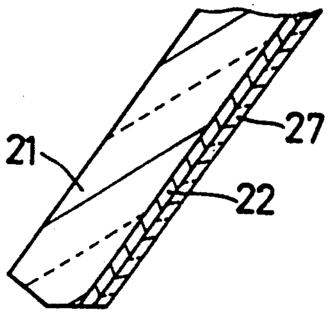

RECORDING HEAD INCLUDING ELECTRODE SUPPORTING SUBSTRATE HAVING THIN-WALLED CONTACT END PORTION, AND SUBSTRATE-REINFORCING LAYER

BACKGROUND OF THE INVENTION

1. Field of the Invention

The present invention relates in general to a recording head for recording or printing images such as characters and graphical representations, by applying an electric current to a recording medium, or a ribbon or film or other form of intermediate member interposed between the recording medium and the recording head. More particularly, the invention is concerned with the configuration of a distal end portion of such a recording head at which the head contacts the recording medium or intermediate member.

2. Discussion of the Prior Art

There will be first described prior art recording heads, and problems encountered in these heads. Various types of recording heads for recording by application of an electric current to a recording medium or an intermediate member have been proposed up to the present. In particular, there is known a recording head having a laminar or multi-layer structure which includes a substrate or substrates, and an array of recording electrodes and an array of return circuit electrodes which are supported by or formed on the substrate or substrates. Examples of this type of recording head are disclosed in laid-open Publication Nos. 61-35972, 62-292461, 54-141140, 58-12790 and 61-230966 of unexamined Japanese Patent Applications.

There is known another type of recording head, in which the array of recording electrodes is formed on one of opposite major surfaces of a substrate, as disclosed in laid-open Publication Nos. 58-104787, 61-37493, 63-30279, 63-87264, 63-160855 60-78772 and 62-238767 of unexamined Japanese Patent Applications.

As disclosed in the publications identified above, the recording head of the types indicated above are adapted such that an electric current is applied to an electrically resistive or conductive layer formed or coated on or carried by a suitable recording medium or a suitable planar intermediate support member in the form of a sheet, film or ribbon. The electrically resistive or conductive layer may be formed on a roller or other support member, or constitute an inner layer of the recording medium or intermediate support member. In a recording operation by using an intermediate ribbon or film having an electrically resistive layer and an ink layer, for example, an electric current applied to the resistive layer through the recording head causes Joule heat to be generated by the resistive layer, whereby selected local areas of the ink layer are heated of the Joule heat, and the ink material in these heated local areas is fused, vaporized or diffused. As a result, the ink material is transferred to the appropriate local areas of the recording medium so as to form a black or colored image. If an electric current is applied directly to a recording medium, the appropriate local areas of the medium are suitably colored due to Joule heat generated by an electric current, or due to removal of the covering material from the medium surface due to an electrical discharge occurring thereon.

The electrically resistive layer provided on the recording medium or intermediate support member may be an electrically conductive layer, an electrically conductive or resistive ink layer (which serves also as an ink-bearing layer), a heat-sensitive layer having an electrolyte, or any form of layer through which an electric current may flow.

In a recording or printing operation by the recording head for use with the recording medium or intermediate support member as described above, the recording electrodes and the return circuit electrode or electrodes must be held in electrical contact with the electrically resistive layer of the recording medium or support member. To this end, the electrodes used in the known recording heads as disclosed in the publications indicated above are formed of a material which has a higher degree of wear resistance than the material of the substrate structure and an electrically insulating layer used for the heads.

An example of such a known recording head is partly illustrated in FIG. 23, wherein a multi-layer structure is formed by two substrates 21, an array of recording electrode 22 formed on one of the substrates 21, an array of return circuit electrodes 23 formed on the other substrate 21, and an electrically insulating layer 24 which separates the two arrays of electrodes 22, 23 and to which the electrode arrays 22, 23 are bonded by respective layers of a suitable adhesive 25, 25. In this arrangement, the end face of the substrate structure 21 occupies a considerably large portion of the entire contact face at the distal end of the head which is adapted to contact the surface of the electrically resistive layer of the recording medium or intermediate support member. In other words, the area of the contact end faces of the electrodes 22, 23 is comparatively small. This area ratio of the contact end face of the substrate structure 21 and electrodes 22, 23 does not provide for a desired electrical contact between the electrodes and the electrically resistive layer. When a recording operation requires a relatively large contacting force of the electrodes against the resistive layer, the known arrangement is not satisfactory for producing high-quality images.

For improving the electrical contact between the electrodes and the resistive layer of an ink ribbon for example, a recording head having a generally pointed contact end portion is proposed as shown in FIG. 24. While this recording head assures improved electrical contact between the electrodes and the resistive layer during an initial period of use, the ratio of the contact end face area of the substrate structure 21 with respect to that of the electrodes 22, 23 increases as the pointed end of the head wears. Satisfactory contacting of the electrodes with the resistive layer may not be obtained if the worn-out contact end of the head is ground for re-shaping by a relatively easy method while the head remains installed on the relevant recording apparatus.

An alternative known approach is to use the electrodes 22, 23 which have increased thicknesses, as indicated in FIG. 25. This arrangement, however, lowers the efficiency or ease of forming the electrodes in the desired patterns in the form of mutually spaced apart stripes.

Another type of recording head is illustrated in FIG. 26. This recording head has an array of recording electrodes 22 which is formed on one major surface of the substrate 21 and covered by an electrically insulating layer 27 made of a comparatively soft material. Although the contact of the electrodes 22 and insulating layer 27 with the resistive layer is better than the contact of the multi-layer heads indicated above, the contact end portion of the electrodes 22 comparatively rapidly wears since the head contacts the resistive layer at one edge thereof on the side of the electrode array 22. As the contact edge of the head is worn or ground for re-shaping, the area ratio of the contact end face of the substrate 21 with respect to the contact end face of the electrodes 22 increases, whereby the electrical contact of the electrodes is deteriorated during use of the head.

In the recording head including the electrodes for applying an electric current to an electrically resistive layer as described above, it is required that the distance between the recording electrode array and the return circuit electrode array be controlled to a small value as accurately as possible, for avoiding a crosstalk between the electrodes to thereby improve the printing result. To meet this requirement, the electrically insulating layer must be formed with a sufficiently small thickness. However, it is practically difficult to form the electrically insulating layer 24 with a small thickness, while maintaining a sufficient degree of mechanical strength of the layer. Thus, the arrangement in which the electrode-to-electrode distance is determined by the thickness of an interposed electrically insulating layer is not satisfactory for reducing the distance between the recording and return circuit electrodes 22, 23.

Further, the known multi-layered head arrangements as shown FIGS. 23 through 25 use the adhesive layers 25 for bonding together the two substrates 21, 21, with the electrically insulating layer 24 interposed between the opposite surfaces of the substrates 21, 21 on which the recording and return circuit electrode arrays 22, 23 are formed. In these arrangements, the distance between the recording and return circuit electrodes 22, 23 is influenced by the thickness of the adhesive layers 25, 25. Since the thickness of the adhesive layers 25 tends to be varied due to a variation in the amount of application of the adhesive material and/or different manners of the application, the electrode-to-electrode distance is likely to be varied and cannot be accurately controlled to a desired nominal value. In this respect, the known head arrangements of FIGS. 23–25 are not sufficiently satisfactory in the quality of printing.

SUMMARY OF THE INVENTION

It is therefore an object of the present invention to provide a recording head for recording by application of an electric current to a recording medium or an intermediate member interposed between the head and the medium, which recording head has an accurately controlled distance between recording and return circuit electrodes, and a sufficient overall mechanical strength, while at the same time assures excellent electrical contact of the electrodes with the medium or intermediate member for a prolonged period of use.

The above object may be achieved according to the principle of the present invention, which provides a recording head operable to apply an electric current to an electrically resistive layer provided on one of a recording medium and a planar intermediate member interposed between the recording medium and the recording head, the recording head having an electrically insulating substrate, at least one recording electrode formed on one of opposite major surfaces of the substrate, and at least one return circuit electrode formed on the other major surface of the substrate, the recording head including an operating end at which the substrate and the electrodes are held in contact with the one of the recording medium and the planar intermediate member, so that the electric current is applied to the electrically resistive layer, wherein the substrate is formed of a material whose wear resistance is lower than that of the recording and return circuit electrodes, and includes a proximal portion, and a thin-walled distal end portion extending from the proximal portion by a predetermined length for contact with the one of the recording medium and the planar intermediate member, the distal end portion having a thickness smaller than that of the proximal portion, as viewed in a direction perpendicular to a direction of extension of the distal end portion, the substrate having a recessed portion formed in at least one of the opposite major surfaces such that the recessed portion at least partially defines the thickness of the distal end portion, a reinforcing layer being disposed to reinforce the thin-walled distal end portion, such that at least a portion of the reinforcing layer is positioned in the recessed portion.

In the recording head of the present invention constructed as described above, the distance between the recording and return circuit electrodes, as measured at the exposed end face of the thin-walled distal end portion of the substrate in the direction of thickness thereof, is determined by the thickness of the distal end portion. Since the thickness of the distal end portion can be relatively accurately controlled by changing the depth of the recessed portion, the electrode-to-electrode distance can be accurately controlled to a desired small value that prevents a crosstalk between the recording and return circuit electrodes. Further, the substrate which is formed of an electrically insulating material, it is not necessary to provide an exclusive electrically insulating layer between the recording and return circuit electrodes, which layer should have a sufficiently small thickness for providing a sufficiently small electrode-to-electrode distance. Accordingly, the elimination of such a thin electrically insulating layer provides a considerable increase in the mechanical strength of the recording head. Moreover, the effective electrode-to-electrode distance in the present recording head can be held constant even after the distal end portion is worn to a certain extent, since the distal end portion extends in the direction perpendicular to the direction of thickness thereof.

The recessed portion may be formed in only one of the opposite major surfaces of the substrate, or both of the opposite major surfaces of the substrate. In the latter case, the reinforcing layer is provided for the recessed portion formed in each of the opposite major surfaces of the substrate.

The reinforcing layer is preferably formed of a material whose wear resistance is lower than that of the recording and return circuit electrodes. The reinforcing layer may be substantially entirely positioned in the recessed portion of the substrate.

Usually, the recording head has an array of mutually spaced-apart parallel strips of an electrically conductive material formed on the one major surface of the substrate. However, the recording head may have a single common return circuit electrode, or an array of mutually spaced-apart parallel strips of an electrically conductive material formed on the other major surface of the substrate.

The thin-walled distal end portion of the substrate may be formed by providing the substrate with a shoulder surface formed adjacent to the distal end portion, such that the shoulder surface partially define the recessed portion which at least partially define the thickness of the distal end portion. The shoulder surface may be an inclined surface which forms an obtuse angle with respect to a surface of the distal end portion which is parallel to the direction of extension of the distal end portion.

The thickness of the thin-walled distal end portion is preferably 150 μm or smaller, more preferably within a range of 25–100 μm. The length of the thin-walled distal end portion is preferably within a range of 50–4000 μm, and more preferably 100–1000 μm.

The substrate is preferably made of a highly machinable ceramic material, while the recording and return circuit electrodes are preferably made of an electrically conductive material whose major component consists of a metal containing at least one material selected from the group consisting of chromium, titanium, tantalum and zirconium, or a compound thereof.

In the case where, the recessed portion is formed in only one of the opposite major surfaces of the substrate, the recording head may further comprise a heat-dissipating layer which covers at least a portion of the other major surface of the substrate.

BRIEF DESCRIPTION OF THE DRAWINGS

The above and optional objects, features and advantages of the present invention will be better understood by reading the following description of presently preferred embodiments of the invention, when considered in conjunction with the accompanying drawings, in which:

FIGS. 14 and 16 are fragmentary elevational views in cross section of further forms of the recording head of the invention;

FIG. 17 is a fragmentary explanatory elevational view in cross section showing a still further form of the recording head of the invention;

FIGS. 20, 21 and 22 are views showing three modifications of the distal end portion of FIG. 19, respectively;

FIGS. 23 through 26 are explanatory elevational view in cross section of known recording heads, taken in a plane parallel to the direction of extension of the electrodes; and FIG. 27 is an elevational cross sectional view of the recording head of FIG. 26 whose distal end portion is worn out.

DETAILED DESCRIPTION OF THE PREFERRED EMBODIMENTS

Figure 1:
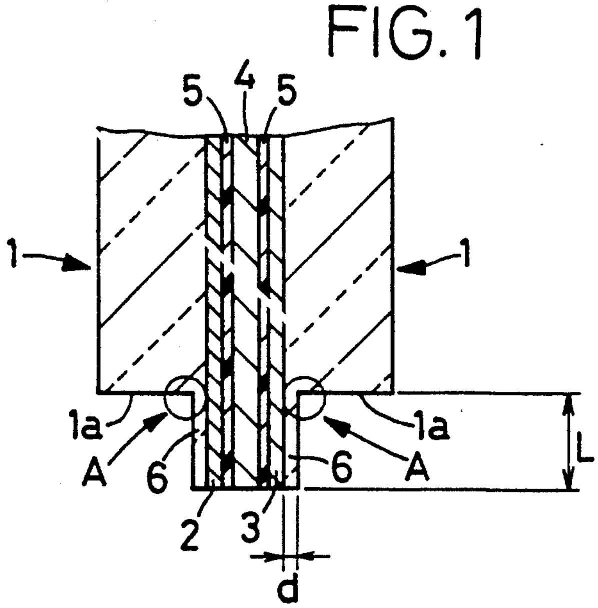
FIGS. 1–6, and FIGS. 9, 10, 14, 16 and 17 are fragmentary explanatory elevational views in cross section of different forms of a recording head of the present invention, taken in a plane parallel to the direction of extension of the electrodes.

Referring first to FIGS. 1–3 and 17, there are shown four different forms of the recording head constructed according to the present invention, which have a laminar or multi-layer structure. Each of these recording heads of FIGS. 1–3 and 17 includes a substrate structure 1, an array of recording electrodes 2, an array of return circuit electrodes 3, an electrically insulating layer 4, and two layers of an adhesive 5, 5. The substrate structure consists of two substrates 1, 1 each of which has opposite major surfaces. The array of recording electrodes 2 is formed on one of the opposite major surfaces of one of the two substrates 1, while the array of return circuit electrodes 3 is formed on one of opposite major surfaces of the other substrate 1 which faces the major surface of the above-indicated one substrate 1 on which the array of recording electrodes 2 is formed. The electrically insulating layer 4 separates the two arrays of electrodes 2, 3 in the direction of thickness thereof, and the adhesive layers 5, 5 are interposed between the electrode arrays 2, 3 and the insulating layer 4, so that the electrodes arrays 2, 3 (substrates 1) are bonded to the insulating layer 4 by the interposed adhesive layers 5, 5.

Figure 4:
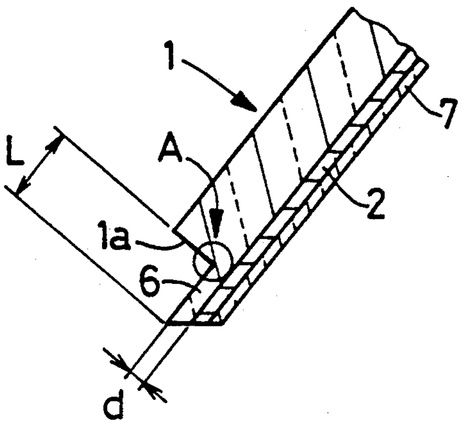
Figure 5:
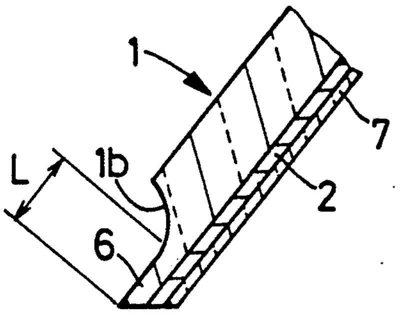
Figure 6:
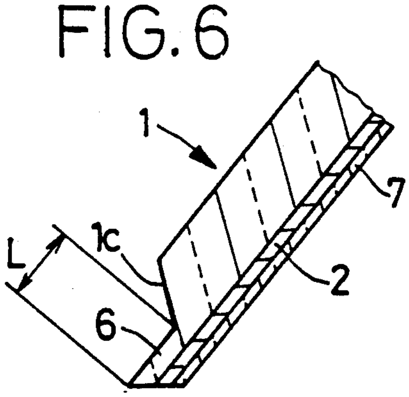

Referring next to FIGS. 4–6, there are shown different forms of the recording head in which the substrate structure consists of a single substrate 1 which supports an array of recording electrodes 2 formed on one of a major surface thereof. In these recording heads, the array of recording electrodes 2 is covered by a covering layer 7 made of a relatively soft electrically insulating material such as a synthetic resin, a ceramic material or a glass material. The synthetic resin may be epoxy resin or polyimide, and the ceramic material may be boron nitride or silica or alumina. The insulating material must be soft enough to avoid a substantial problem in terms of contact of the array of recording electrodes 2 with a recording medium or an intermediate member interposed between the recording head and the recording medium.

In each of the recording heads shown in FIGS. 1–6 and 17, each substrate 1 has a proximal portion (upper portion as viewed in the figures) which is located remote from the recording medium during operation of the head, and a thin-walled distal end portion 6 (lower portion as viewed in the figures) which extends from the proximal portion by a suitable length or distance (indicated at L in the figures) in the direction toward the recording medium. The distal end portion 6 has a thickness "d" (FIGS. 1 and 4) which is smaller than that of the proximal portion, as viewed in the direction perpendicular to the direction of extension of the portion 6. This thin-walled distal end portion 6 is adapted so that the operating end face in which the electrodes 2, 3 (2) are exposed contacts the electrically resistive layer provided on the recording medium or ink ribbon (provided as the planar intermediate support member).

The thin-walled distal end portion 6 is formed by providing the substrate 1 with a shoulder surface 1*a*, 1*b*, 1*c*, which is formed adjacent to the proximal end of the distal end portion 6, as shown in FIGS. 1–6 and 17. As indicated at "A" in FIG. 1, the shoulder surface 1*a*, 1*b*, 1*c* terminates in the proximal end of the distal end portion 6. In the recording head of FIG. 1, each of the two substrates 1 of the substrate structure has the shoulder surface 1*a* which is perpendicular to the direction of extension of the distal end portion 6, i.e., parallel to the direction of thickness "d" of the distal end portion 6. In the recording head of FIG. 4, the single substrate 1 has the shoulder surface la similar to that of FIG. 1.

The shoulder surface need not be at right angles to the direction of extension of the thin-walled end portion 6. In the recording head of FIG. 2, each of the two substrates 1 has the shoulder surface 1*b* which is a fillet having a suitable radius of arc and which terminates in the surface of the distal end portion 6 parallel to the direction of extension. In the recording head of FIG. 5, the shoulder surface 1*b* is provided for the single substrate 1.

Figure 3:
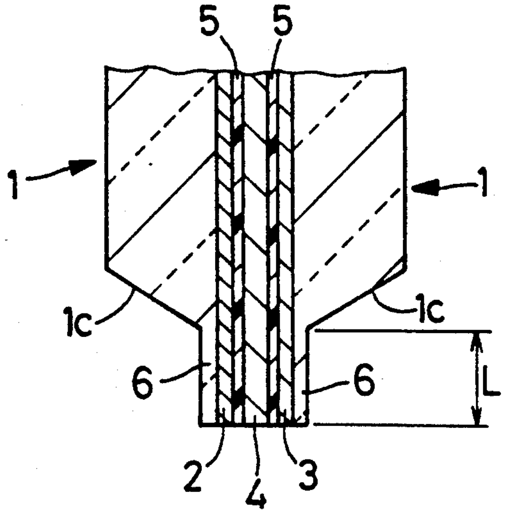
Figure 7:
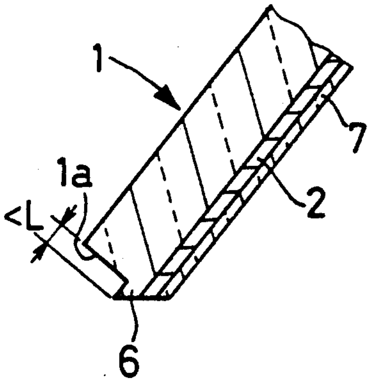
FIG. 7 is a fragmentary elevational view in cross section of the recording head of FIG. 4 whose distal end portion is worn out.

In the recording head of FIG. 3, each of the two substrates 1 has an inclined shoulder surface 1*c* which forms an obtuse angle with respect to the surface of the distal end portion 6 which is parallel to the direction of extension. In the recording head of FIG. 6, the single substrate 1 has the inclined shoulder surface 1*c* similar to that of FIG. 3. FIG. 7 shows the distal end portion 6 of the recording head of FIG. 4, which has a reduced length due to wear. In the recording head of FIG. 17, only one of the two substrates 1 has the inclined shoulder surface 1*c*.

Figure 9:
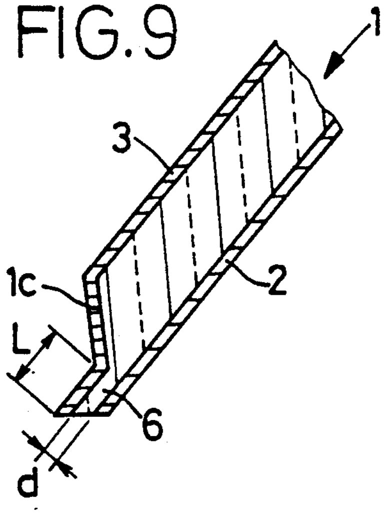
Figure 10:
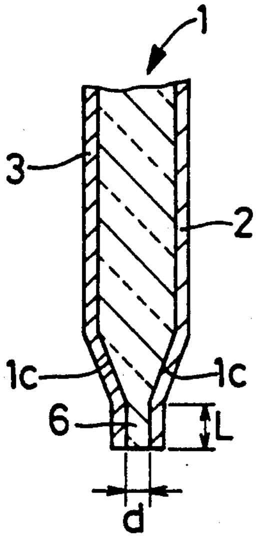

Referring to FIGS. 9 and 10, two further different forms of recording head are shown. In these recording heads, a single substrate 1 has opposite major surfaces on which the arrays of recording electrodes and return circuit electrodes 2, 3 are formed, respectively. In the recording head of FIG. 9, the inclined shoulder surface 1*c* is formed adjacent to the thin-walled distal end portion 6. In the recording head of FIG. 10, the two inclined shoulder surfaces 1*c* are formed adjacent to the thin-walled distal end portion 6 such that the distal ends of the two inclined shoulder surfaces 1*c* define the thickness "d" of the end portion 6.

The thickness "d" of the thin-walled distal end portion 6 of the substrate 1, and the length "L" of the distal end portion 6 (which is shortened as the end portion 6 wears) are determined by the materials of the substrate structure 1, electrodes 2, 3, and by the required properties or characteristics to be exhibited by the distal end portion 6 during a recording operation, and are further determined by the desired force of electrical contact between the electrodes 2, 3 and the resistive layer of the recording medium or ink ribbon. Generally, the thickness "d" is desirably 700 μm or smaller, preferably within a range of 30–400 μm, and more preferably within a range of 30–100 μm. The length "L" of the distal end portion 6 is desirably held within a range of 50–4000 μm, preferably within a range of 100–1000 μm. The desirability of holding the thickness and length within the above-indicated ranges was confirmed by experiments in which the wear condition of specimen recording heads was observed.

Figure 2:
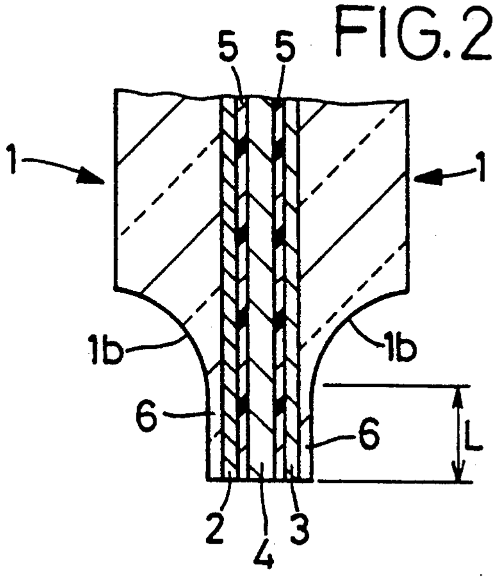
Figure 17:
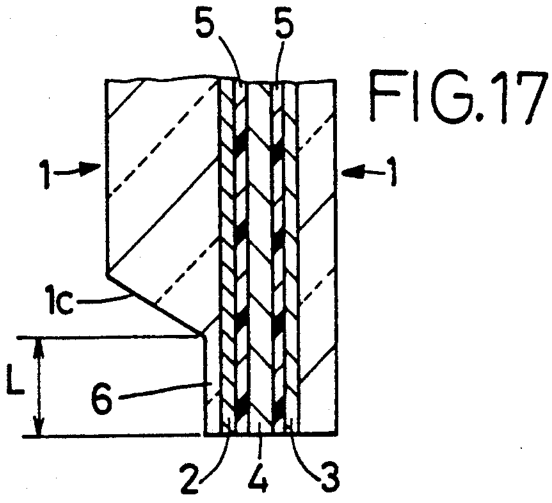

The thin-walled distal end portion 6 is provided for each of the two substrates 1, 1, as shown in FIGS. 1–3, or for only one of the two substrates 1, 1, as shown in FIG. 17. In the example of FIG. 17, the other substrate 1 which carries the return circuit electrodes 3 is not provided with a thin-walled distal end portion. Namely, the distal portion of the substrate 1 having the electrodes 3 has the same thickness as the proximal portion.

It is desirable that the material for the substrate structure 1 be an electrically insulating material which has a comparatively low resistance to wear and provides a mechanical strength sufficient to support the electrodes 2, 3, and which may be easily processed for shaping the distal end portion 6 with high precision. The electrically insulating material used for the substrate structure 1 preferably consists of a ceramic material having lower degrees of hardness and wear resistance than that of the electrodes 2, 3. For easy shaping of the distal end portion 6 and sufficient mechanical strength, it is particularly desirable to form the substrate structure 1 of a material selected from the group which consists of: highly machinable glass ceramic containing mica; boron nitride; highly machinable ceramic containing boron nitride; highly machinable ceramic containing aluminum nitride and boron nitride. In particular, the machinable glass ceramic containing mica is preferably used.

The shaping of the substrate structure 1 for forming the thin distal end portion 6 may be formed before the electrodes (recording electrodes 2 and/or return circuit electrodes 3) are formed on the substrate structure. Where a substrate 1 has the electrodes 2 or 3 formed on one of the opposite major surfaces, the distal end portion 6 may be formed by a grinding, slicing or other suitable machining operation, after a laminar structure as illustrated in FIGS. 23 and 26 are prepared. Where a substrate 1 has the recording and return circuit electrodes 2 and 3 formed on the respective opposite major surfaces thereof as illustrated in FIGS. 9 and 10, it is usual that the substrate 1 is first subjected to the suitable shaping operation to form the distal end portion 6, and then the electrodes 2, 3 are formed on the shaped substrate 1.

Figure 8:
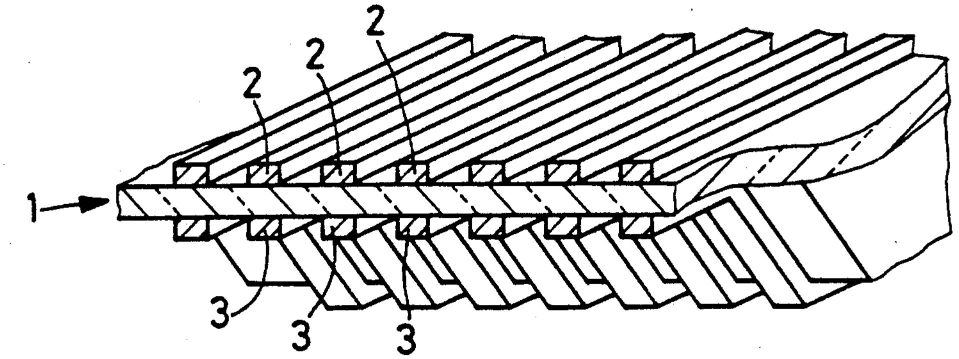
FIG. 8 is a perspective view showing the distal end portion of the recording head of FIG. 9.

Referring to the perspective view of FIG. 8, the single substrate 1 has the recording electrode array 2 on one of its major surfaces, and the return circuit electrode array 3 on the other major surface. The distal end portion of this recording head of FIG. 8 which includes the distal end portion 6 of the substrate 1 is shown in FIG. 9, which is a cross sectional view taken in a plane which is parallel to the direction of extension of the electrodes 2, 3 and perpendicular to the plane of the substrate 1. The thickness "d" of the distal end portion 6 is 70 μm, and the length "L" of the same is 300 μm.

It will be understood that the substrate 1 of the recording head of FIGS. 8 and 9 also serves as a layer for electrically insulating the recording electrodes 2 and the return circuit electrodes 3 from each other. Thus, this embodiment of FIGS. 8 and 9 eliminates the relatively exclusive electrically insulating layer 4 required in the embodiments of FIGS. 1–3 and 17 described above and in an embodiment of FIG. 11 which will be described. In the absence of the electrically insulating layer 4 which is relatively thin over its entire area and interposed between the two arrays of electrodes 2, 3, the recording head of FIGS. 8 and 9 is desirable in terms of the ease of handling and mechanical strength.

In the recording head of FIG. 10, similar to the head of FIGS. 8 and 9, the substrate 1 functions also as an electrically insulating layers for the electrodes 2, 3. In this embodiment of FIG. 10, the opposite major surfaces of the single substrate 1 should be shaped to provide the inclined shoulder surfaces 1*c*, 1*c* for forming the distal end portion 6. In this respect, the recording head of FIGS. 8 and 9 is advantageous over the recording head of FIG. 10 having one inclined shoulder surface 1*c*, since the former head may be easily shaped with comparatively high dimensional accuracy.

In the recording heads of FIGS. 8–10, it may be preferable to reinforce the head structure for improving the thin distal end portion 6, by providing the substrate 1 or electrodes 2, 3 with a suitable covering layer for covering the surfaces of the substrate or electrodes. The covering layer may be formed of an electrically insulating material such as epoxy resin, polyimide and other synthetic resins, boron nitride, silica and other ceramic materials, or glass materials. The covering layer may be replaced by a thin film or sheet of a highly machinable glass ceramic material, highly machinable ceramic material, or metallic material, which is bonded to the substrate 1 or electrode arrays 2, 3. This film or sheet may be a metallic sheet coated with an electrically insulating material.

If the recording heads of FIGS. 8–10 in which the substrate 1 serves also as the insulating layers for the electrodes 2, 3 considerably suffer from accumulation of heat at the thin distal end portion 6, it is possible and desirable to provide a suitable reinforcing layer or film which is formed principally of a highly thermally conductive material such as a metallic material, boron nitride and aluminum nitride, so that this layer or film serves as a heat-dissipating layer as indicated at 8 in FIGS. 13–16. The reinforcing, heat-dissipating layer 8 covers the recording electrode array 2. In these figures, reference numeral 5 designates an adhesive, while reference numeral 7 designates an electrically insulating layer which serves to reinforce the thin-walled distal end portion 6 of the substrate 1. The function of this reinforcing layer 7 is similar to that of reinforcing layers 17, 17*a*, 17*b* shown in FIGS. 18–22 which will be described.

The recording and return circuit electrodes 2, 3 are formed of an electrically conductive material which has a higher degree of wear resistance than the substrate structure 1 for supporting the electrodes, or than the electrically insulating layer 4. Preferably, a major content of the electrically conductive material for the electrodes 2, 3 is selected from the group which includes: metals such as chromium, titanium, tantalum and zirconium; alloys containing these metals; and compounds of the metals. These materials are advantageously used owing to their comparatively high wear resistance and comparatively low rate of consumption due to an electrical effect during use of the head. Particularly, chromium, and an alloy or a compound containing chromium are preferably used as a major component of the electrically conductive material for the electrodes. More preferably, the electrodes are formed principally of an alloy or compound containing chromium and nitrogen.

The thickness of the recording and return circuit electrodes 2, 3 is preferably at least 1 μm. The electrodes 2, 3 may be plated with nickel, tin, copper, gold, chromium or other suitable metal, as required. The adhesive layers 5, 5 may be formed of an inorganic adhesive containing alumina, silica or boron nitride, a resin adhesive containing expoxy, phenol or polyimide, or a mixture of the inorganic and resin adhesives described above. Preferably, the adhesive layers 5 are formed of an inorganic adhesive containing alumina, silica or boron nitride.

Figure 11:
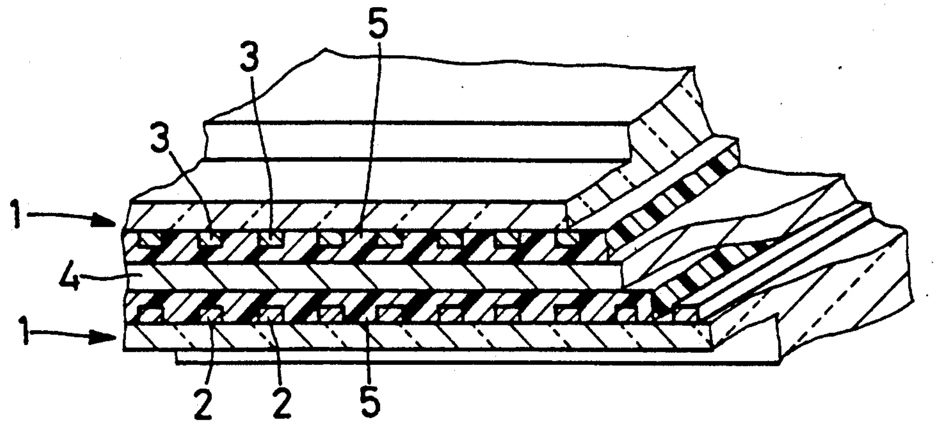
FIG. 11 is a perspective view schematically illustrating the distal end portion of the recording head of FIG. 1.

Referring next to FIG. 11, there is schematically shown in perspective a laminar structure of the recording head of FIG. 1. It will be understood that the cross sectional view of FIG. 1 is taken in a plane which is parallel to the direction of extension of the electrodes 2, 3 and perpendicular to the plane of the substrates 1. In this specific embodiment of FIGS. 1 and 11, the two substrates 1 of the substrate structure are formed of a highly machinable glass ceramic material containing mica, and the electrode arrays 2, 3 are formed by first applying by sputtering respective chromium layers on the appropriate major surfaces of the respective substrates 1, and photoetching the chromium layers in predetermined patterns such that a plurality of chromium strips for each of the two electrode arrays 2, 3 extend parallel to each other and are spaced apart from each other in the direction perpendicular to the direction of extension of the chromium strips. Then, the formed spaced-apart chromium strips are heat-treated in an atmosphere which contains a nitrogen gas and a hydrogen gas. The formed array of the recording electrodes 2 consists of 480 chromium strips which are arranged at a spacing pitch of 170 μm, and each of the chromium strips has a width of 100 μm and a thickness of 6 μm. The two substrates 1, 1 having the electrode arrays 2, 3 are bonded together by the adhesive layers 5, with the electrically insulating layer 4 interposed between the two electrode arrays 2, 3 (two substrates 1, 1). The insulating layer 4 consists of an integrated or foliated mica sheet having a thickness of 100 μm. The thin distal end portion 6 (FIG. 1) of each substrate 1 has a thickness "d" of 100 μm, and a length "L" of 2000 μm.

Figure 12:
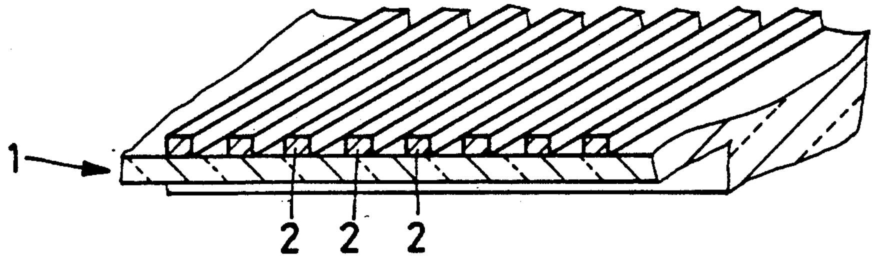
FIG. 12 is a perspective view schematically illustrating the distal end portion of the recording head of FIG. 4.
Figure 13:
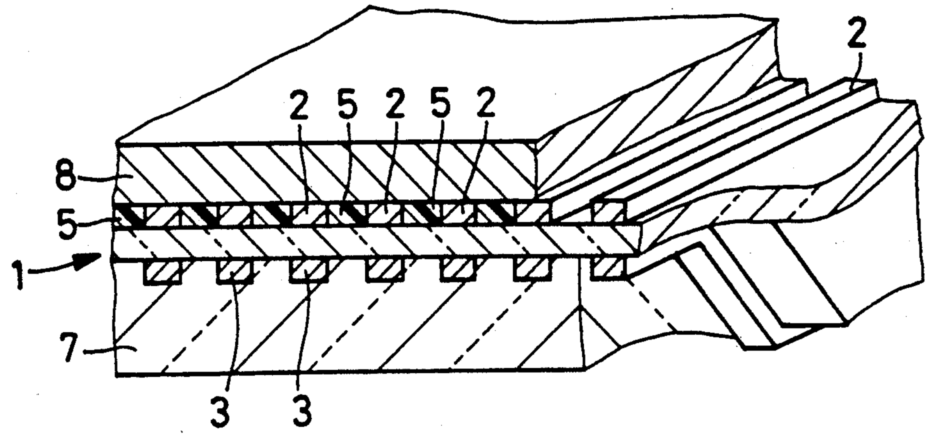
FIGS. 13 and 15 are perspective views schematically showing the recording heads of FIGS. 14 and 16, respectively.
Figure 14:
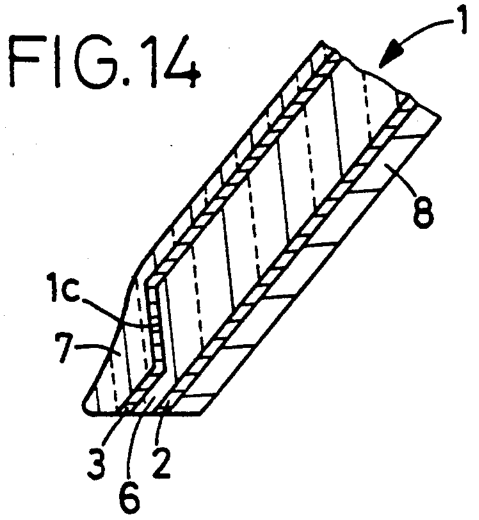
Figure 15:
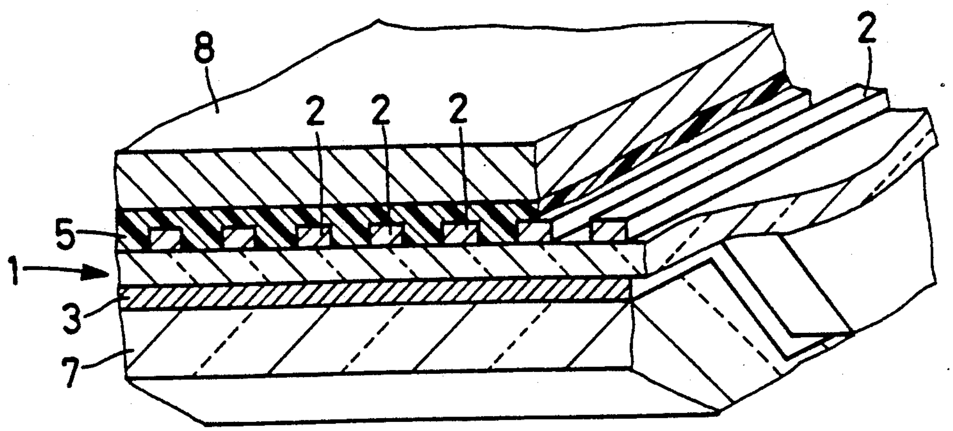
Figure 16:
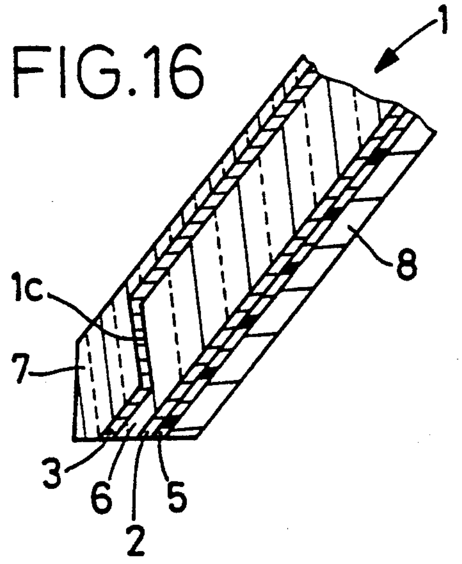

A recording head different in structure from that of FIG. 11 is schematically illustrated in FIG. 12, and in the cross sectional view of FIG. 4. As shown in these FIGS. 4 and 12, this recording head uses one substrate 1 consisting of a highly machinable glass ceramic sheet. On one of the opposite major surfaces of this substrate 1, there is formed the array of the recording electrodes 2 in the same manner as described with respect to the embodiment of FIGS. 1 and 11. The distal end portion 6 (FIG. 4) has a thickness "d" of 100 μm, and a length "L" of 500 μm.

The different forms of the recording head which have been described above were tested as incorporated in a recording apparatus, such that the electrodes 2, or the electrodes 2 and 3 were held in sliding contact with an electrically resistive layer of an ink ribbon, during repetitive printing cycles. The quality of the images printed by the individual recording heads were evaluated. The test revealed satisfactory results obtained from all the tested specimens, i.e., sufficiently high density and clearness or crispness of the printed images, and excellent state of contacting of the electrodes 2, 3 with the resistive layer of the ink ribbon. FIG. 7 shows the recording head of FIG. 4 whose distal end portion 6 has been worn out. As indicated in FIG. 7, the ratio of the contact area of the substrate 1 with respect to that of the electrode 2 remains unchanged even after the wearing of the distal end portion 6. Namely, the distal end portion 6 maintains the initial contacting state for a long period of use.

Figure 18:
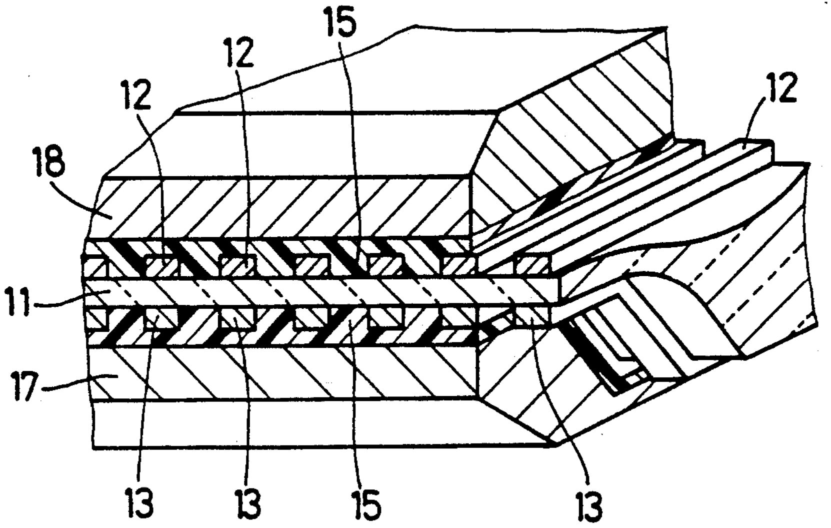
FIG. 18 is a perspective view schematically illustrating the distal end portion of a further modified form of the recording head of the invention.
Figure 19:
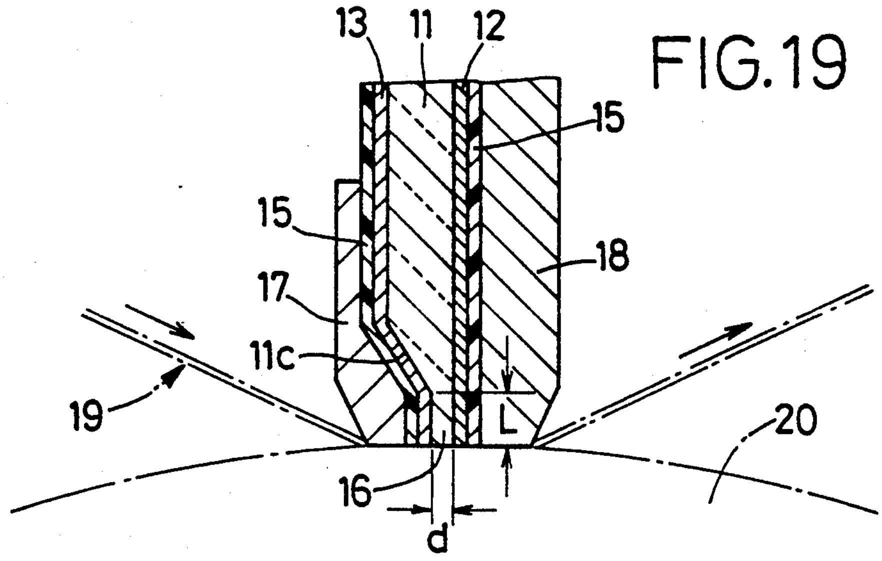
FIG. 19 is an elevational view in cross section of the recording head of FIG. 18, taken in a plane parallel to the direction of extension of the electrodes.

Referring next to FIGS. 18 and 19, there is shown a further embodiment of the present invention in the form of a multi-layered recording head using a single substrate 11 which has an electrically insulating property. An array of a multiplicity of recording electrodes 12 in the form of spaced-apart parallel strips is formed on one of the opposite major surfaces of the substrate 11. On the other major surface of the substrate 11, there is formed an array of a multiplicity of return circuit electrodes 13 also in the form of spaced-apart parallel strips. The substrate 11 may be made of a material as described above with respect to the substrate 1 used in the preceding embodiments. In particular, the material for the substrate 11 desirably has lower degrees of wear resistance and hardness than those for the electrodes 12, 13. Further, it is desirable to use a ceramic material which is suitable for precision machining.

Like the substrates 1 used in the preceding embodiments of FIGS. 9, 10, 14 and 16, the substrate 11 has an inclined shoulder surface 11*c* formed so as to provide a thin-walled distal end portion 16 over a length "L" as indicated in FIG. 19. The inclined shoulder surface 11*c* is formed on the side of the substrate 11 on which the return circuit electrodes 13 are formed, so that the distal end portion 16 has a thickness "d" smaller than the thickness of the proximal portion of the substrate 11. In other words, the substrate 11 has a cutout or recessed portion partially defined by the inclined shoulder surface 11*c* which extends from the proximal portion to the thin-walled distal portion 16, so that the end of the inclined shoulder surface 11*c* remote from the proximal portion defines the thickness "d" of the thin-walled distal end portion 16.

Since the return circuit electrodes 13 are formed so as to extend over the recessed portion partially defined by the inclined shoulder surface 11*c* and the thin-walled distal end portion 16, the distance between the recording electrodes 12 and the return circuit electrodes 13, as measured on the exposed end face of the distal end portion 16 is determined by the thickness "d" of the distal end portion 16. Since the material of the substrate 11 can be easily machined with high dimensional accuracy to provide the inclined shoulder surface 11*c* and the thin-walled distal end portion 16, the electrode-to-electrode distance can be accurately controlled to a desired value for permitting high printing quality.

The substrate 11 having a relatively large thickness at the proximal portion and a relatively small thickness at the distal end portion 16 also serves as an electrically insulating layer for electrical insulation between the recording electrodes 12 and the return circuit electrodes 13. Thus, the present recording head does not require a thin electrically insulating layer as shown at 24 in FIG. 23, for example, and therefore assures improved mechanical strength, and permits relatively easy installation on a printer. This improvement in the mechanical strength can be provided without having to increase the electrode-to-electrode distance at the operating end face of the recording head in contact with a recording medium or an intermediate support member such as an ink ribbon or film. Namely, the thin-walled distal end portion 16 with a reduced thickness "d" assures a desired relatively small size ("d") of a dot printed by the head, while preventing a crosstalk between the recording and return circuit electrodes 12, 13. Since the thin-walled distal end portion 16 has the thickness "d" over the length "L", the electrode-to-electrode distance can be held constant during wearing of the distal end portion 16.

The thickness "d" and length "L" of the thin-walled distal end portion 16 of the substrate 11 are determined by the materials of the substrate 11 and electrodes 12, 13, and by the required properties of the distal end portion 16 to be exhibited during a recording operation, and are also determined by the desired force of electrical contact of the electrodes 12, 13 with an electrically resistive layer of the recording medium or ink ribbon or other intermediate support member. Generally, the thickness "d" is desirably 150 μm or smaller, preferably within a range of 25–100 μm, and the length "L" is desirably held within a range of 50–4000 μm, preferably within a range of 100–1000 μm.

The substrate 11 is provided with the thin-walled distal end portion 16, during formation of the substrate 11 by a suitable method. Alternatively, the thin-walled distal portion 16 may be provided by forming the recessed portion partially defined by the inclined shoulder surface 11*c*, by a grinding, slicing or other precision machining operation on one of the opposite major surfaces of the formed substrate 11. Then, the return circuit electrodes 13 are formed on one of the major surfaces of the thus machined substrate 11 on which the recessed portion (inclined shoulder surface 11*c*) is provided. On the other major surface of the substrate, the recording electrodes 12 are formed. The electrodes 12, 13 are formed so as to extend over the opposite surfaces of the thin-walled distal end portion 16.

According to an alternate method, the recording electrodes 12 are first formed on one of the opposite major surfaces of the substrate 11, and then the appropriate end portion of the substrate 11 is machined to form the recessed portion (11*c*) and thereby provide the thin-walled distal end portion 16. The return circuit electrodes 13 are subsequently formed on the other surface of the substrate. Although the distal end portion 16 in the embodiment of FIG. 19 is partially defined by the inclined shoulder surface 11*c* which forms an obtuse angle with respect to the direction of extension (length "L") of the distal end portion 16, the substrate 11 may have a shoulder surface (as indicated at 1*a* in FIG. 4) which is perpendicular to the direction of extension of the distal end portion 16, or a shoulder surface which is a fillet with a suitable radius of curvature (as indicated at 1*b* in FIG. 5).

Like the electrodes 2, 3 in the preceding embodiments, the electrodes 12, 13 are formed of an electrically conductive material having a higher degree of wear resistance than the material of the substrate 11. Preferred materials for the electrodes 12, 13 are described above with respect to the electrodes 2, 3. The electrodes 12, 13 are formed by a suitable film-forming method such as sputtering, vapor deposition, ion-plating, CVD (chemical vapor deposition), coating, printing or plating, or by an etching or lift-off method utilizing a photolithographic technique. The electrodes 12, 13 preferably have a thickness of at least 1 μm, and may be plated with nickel, tin, copper, gold, chromium or other suitable metal, as required.

The array of return circuit electrodes 13 is covered by a reinforcing layer 17 which has an inner surface following the profile of the recessed portion (inclined shoulder surface 11*c*) of the substrate 11. The reinforcing layer 17 is secured to the substrate 11 by an adhesive layer 15 interposed between the reinforcing layer 17 and the substrate 11 so as to embed the electrodes 13 in the layer 15. This reinforcing layer 17 functions to structurally reinforce the thin-walled distal end portion 16 of the substrate 11, such that at least a portion of the reinforcing layer 17 is positioned within the recessed portion of the substrate 11 which is defined by the inclined shoulder surface 11*c* and the distal end portion 16.

On the other hand, the array of recording electrodes 12 is covered by a heat-dissipating layer 18 which is secured to the substrate 11 by another adhesive layer 15.

The heat-dissipating layer 18 is formed of a thermally conductive material such as boron nitride or aluminum nitride, so that the layer 18 serves to dissipate heat from the recording head.

The provision of the reinforcing layer 17 for reinforcing the thin-walled distal end portion 16 of the substrate 11 (operating end portion of the recording head) eliminates an otherwise required coating formed to cover the working end portion of the recording head, which coating may be worn or flaked off during operation of the recording head with the distal end portion 16 held in sliding contact with a recording medium or an ink ribbon, for example. The wearing or flaking off of such coating may result in deterioration of the printing quality due to the removed material of the coating remaining between the electrodes 12, 13 and the recording medium or ink ribbon. The present recording head which has the reinforcing layer 17 is free from this problem.

In operation of the present recording head, the operating or working end of the head is held in sliding contact with a heat-sensitive recording medium 19 which has an electrically resistive layer and a heat-sensitive layer, for example, as illustrated in FIG. 19. The recording medium 19 is fed in the direction indicated by arrows in FIG. 19 while it is supported by a platen 20. The recording head is forced against the platen 20 via the recording medium 19, while printing is effected on the medium 19. Since the recording and return circuit electrodes 12, 13 contact the recording medium 19, at right angles with respect to the direction of feeding of the medium 19, the exposed end faces of the electrodes 12, 13 at the distal end portion 16 may smoothly slide on the surface of the recording medium 19, without marring or damaging the recording medium 19.

The reinforcing layer 17 used to reinforce the recessed portion (11*c*) of the substrate 11 is formed of a material which has lower hardness and wear resistance than the material of the electrodes 12, 13, preferably a highly machinable glass ceramic sheet which may or may not contain mica, a highly machinable ceramic sheet, or a metal sheet whose surface is electrically insulated. The reinforcing layer 17 may function also as a heat-dissipating layer like the layer 18, if the layer 17 is formed from a sheet whose major component consists of a thermally conductive material such as boron nitride or aluminum nitride. If the reinforcing layer 17 is formed of a material having the same coefficient of thermal expansion as the material of the substrate 11, thermal stresses which may occur at the bonding interface between the substrate 11 and reinforcing layer 17 may be minimized, and the reinforcing layer 17 is effectively protected from separation from the substrate 11, buckling or warpage, or deformation due to the thermal stresses.

The heat-dissipating layer 18 provided on the side of the substrate 11 remote from the reinforcing layer 17 is generally formed of a material similar to that of the reinforcing layer 17, so that the layer 18 may also function to reinforce the substrate 11, as well as to dissipate heat from the recording head. In the case where the reinforcing layer 17 functions also as a heat-dissipating layer, the layer 18 may be provided for the sole purpose of reinforcing the substrate 11.

The adhesive layers 15, 15 for bonding the reinforcing and heat-dissipating layers 17, 18 may be formed of an inorganic adhesive containing alumina, silica or boron nitride, a resin adhesive containing expoxy, phenol or polyimide, or a mixture of the inorganic and resin adhesives described above. Preferably, the adhesive layers 15 are formed of an inorganic adhesive containing alumina, silica or boron nitride.

The recording head structure having the thin-walled distal portion 16 reinforced by the reinforcing layer 17 as shown in FIGS. 18 and 19 may be modified as shown in FIGS. 20, 21 and 22.

In the printing head of FIG. 20, the substrate 11 has a pair of inclined shoulder surfaces 11*c*, 11*c* on the opposite sides thereon, so that the thin-walled distal end portion having a thickness "d" and a length "L" is formed so as to extend from the middle of the thickness of the proximal portion of the substrate 11. The recording and return circuit electrodes 12, 13 are formed so as to extend over the recessed portions partially defined by the inclined shoulder surfaces 11*c*, 11*c*, so that the electrode-to-electrode distance at the exposed end of the thin-walled distal end portion 16 is determined by the thickness "d" of the distal end portion 16. The distal end portion 16 of the substrate 11 is reinforced by a pair of reinforcing layers 17*a*, 17*b* formed to cover the arrays of the electrodes 13, 12 via the adhesive layers 15. Each reinforcing layer 17*a*, 17*b* has an inner surface which follows the profile of the recessed portions of the substrate 11. In the present embodiment in which the two reinforcing layers 17*a*, 17*b* are provided, one of these two layers is formed of a thermally conductive material so as to function as a heat-dissipating layer.

The embodiments of FIGS. 21 and 22 use the substrate 11, recording and return circuit electrodes 12, 13 and heat-dissipating layer 18 which are similar to those of the embodiment of FIGS. 18 and 19. However, the reinforcing layer 17 (FIG. 21) or 17*a* (FIG. 22) is substantially entirely positioned within the recessed portion of the substrate 11 which is partially defined by the inclined shoulder surface 11*c*. The reinforcing layer 17, 17*a* is bonded to the substrate by the adhesive layer 15. In the recording head of FIG. 22, another reinforcing layer 17*b* is provided so as to entirely cover the recessed portion of the substrate 11 and the reinforcing layer 17*a*.

Examples of the recording head according to the embodiments of FIGS. 18–19, FIG. 20, FIG. 21 and FIG. 22 were prepared and tested.

In the examples according to FIGS. 18–19, 21 and 22, the substrate 11 was formed of a highly machinable glass ceramic material containing mica. The recording and return circuit electrodes 12, 13 were formed by first forming by sputtering chromium films on the opposite major surfaces of the substrate 11, photoetching the chromium films through suitable etching masks, and then heat-treating the thus obtained arrays of spaced-apart parallel chromium strips in an atmosphere containing nitrogen and hydrogen gases. Each of the formed arrays consists of 1000 chromium strips which are arranged at a spacing pitch of 125 μm, and each chromium strip has a width of 70 μm and a thickness of 6 μm. The distal end portion 16 has a thickness "d" of 70 μm, and a length "L" of 1000 μm. The reinforcing layers 17, 17*a*, 17*b* were formed of a highly machinable glass ceramic containing mica, while the heat-dissipating layer 18 was formed of boron nitride. These reinforcing layers 17, 17*a*, 17*b* were bonded to the appropriate surfaces of the substrate 11, by the adhesive layers 15 formed of an inorganic material containing alumina.

In the example according to the embodiment of FIG. 20, the substrate 11 made of a highly machinable glass ceramic was formed with a pair of recessed portions in the opposite major surfaces, so that the thin-walled distal end portion 16 had a thickness "d" of 40 μm and a length "L" of 500 μm. The electrodes 12, 13 were formed on the opposite major surfaces of the substrate 11, in the same manner as described above. Each array of electrodes 12, 13 consists of 50 chromium strips which are arranged at a spacing pitch of 80 μm, and each chromium strip has a width of 50 μm. The reinforcing layer 17*a* formed to cover one of the recessed portions of the substrate 11 was formed of a highly machinable glass ceramic containing mica, while the reinforcing layer 17*b* formed to cover the other recessed portion was formed of a highly machinable ceramic containing boron nitride and aluminum nitride. The adhesive layers 15 were formed of an inorganic adhesive containing alumina.

The recording heads of FIGS. 18–22 prepared as described above were tested in a printer such that the electrodes 12, 13 were held in sliding contact with the electrically resistive layer of the recording medium 19 (FIG. 19), during repetitive printing cycles. The quality of the images printed by the recording heads under examination were evaluated. The test revealed excellent results for all the specimens, i.e., sufficiently high density and clearness or crispness of the printed images, and good contact of the electrodes 12, 13 with the recording medium 19.

While the present invention has been described in detail in its presently preferred embodiments referring to the accompanying drawings, it is to be understood that the invention is not construed to be limited to the details of the illustrated embodiments, but that the invention may be embodied with various changes, modifications and improvements, which may occur to those skilled in the art, without departing from the spirit and scope of the invention defined in the appended claims.

For instance, the arrays of return circuit electrodes 3, 13 used in the illustrated embodiments may be replaced by a single common electrode in the form of an electrically conductive layer or film.

What is claimed is:

1. A recording head operable to apply an electric current to an electrically resistive layer provided on one of a recording medium and a planar intermediate member, said planar intermediate layer being interposed between the recording medium and the recording head, said recording head having an electrically insulating ceramic substrate, at least one recording electrode formed on one of two opposite major surfaces of said substrate, and at least one return circuit electrode formed on the other major surface of the substrate, said recording head including an operating end at which said substrate and said electrodes are held together in direct contact with said one of the recording medium and the planar intermediate member, so that the electric current is applied to said electrically resistive layer, wherein the improvement comprises:

said substrate being formed of a material whose wear resistance is lower than that of said recording and return circuit electrodes, and includes a proximal portion, and a thin-walled distal end portion extending from the proximal portion by a predetermined length for contact with said one of the recording medium and the planar intermediate member, the distal end portion having a constant thickness, between electrodes, smaller than that of the proximal portion, as viewed in a direction perpendicular to a direction of extension of the distal end portion;

said substrate having a recessed portion formed in at least one of said opposite major surfaces such that said recessed portion at least partially defines said thickness of said distal end portion; and a reinforcing layer disposed to reinforce said thin-walled distal end portion, such that at least a portion of said reinforcing layer is positioned in said recessed portion.

2. The recording head of claim 1, wherein said recessed portion is formed in one of said two opposite major surfaces of said substrate.

3. The recording head of claim 1, wherein said recessed portion is formed in both of said two opposite major surfaces of said substrate, and said reinforcing layer is at least partly positioned in said recessed portion formed in each of said opposite major surfaces.

4. The recording head of claim 1, wherein said reinforcing layer is formed of a material whose wear resistance is lower than that of said recording and return circuit electrodes.

5. The recording head of claim 1, wherein said at least one recording electrode consists of an array of mutually spaced-apart parallel strips of an electrically conductive material formed on said one major surface of said substrate.

6. The recording head of claim 1, wherein said at least one return circuit electrode consists of an array of mutually spaced-apart parallel strips of an electrically conductive material formed on said other major surface of said substrate.

7. The recording head of claim 1, wherein said substrate has a shoulder surface formed adjacent to the distal end portion, so as to partially define said recessed portion.

8. The recording head of claim 7, wherein the shoulder surface is an inclined surface which forms an obtuse angle with respect to a surface of the distal end portion which is parallel to the direction of extension of the distal end portion.

9. The recording head of claim 1, wherein the constant thickness of said thin-walled distal end portion is 150 μm or smaller.

10. The recording head of claim 9, wherein the constant thickness of said distal end portion is within a range of 25–100 μm.

11. The recording head of claim 1, wherein said predetermined length is within a range of 50–4000 μm.

12. The recording head of claim 11, wherein said predetermined length is within a range of 100–1000 μm.

13. The recording head of claim 1, wherein said substrate is made of a highly machinable ceramic material.

14. The recording head of claim 1, wherein said at least one recording electrode and said at least one return circuit electrode are made of an electrically conductive material whose major component consists of a metal containing at least one material selected from the group consisting of chromium, titanium, tantalum and zirconium, or a compound thereof.

15. The recording head of claim 1, wherein said reinforcing layer is substantially entirely positioned in said recessed portion of said substrate.

16. The recording head of claim 1, wherein said recessed portion is formed in one of said two opposite major surfaces of said substrate, said recording head further comprising a heat-dissipating layer which covers at least a portion of the other major surface of said substrate.

17. The recording head of claim 1, wherein said recessed portion is formed in one of said two opposite major surfaces of said substrate on which said at least one return circuit electrode is formed.

* * * * *